US005610383A

United States Patent [19]

Chumbley

[11] Patent Number: 5,610,383

[45] Date of Patent: Mar. 11, 1997

[54] DEVICE FOR COLLECTING VOTING DATA

[76] Inventor: Gregory R. Chumbley, 3801 NE. 207 St., #35, Miami, Fla. 33180

[21] Appl. No.: 638,238

[22] Filed: Apr. 26, 1996

[51] Int. Cl.[6] ............................. G06K 7/00; G07C 13/00

[52] U.S. Cl. ............................. 235/386; 235/51; 395/212

[58] Field of Search ............................. 235/386, 50, 51, 235/52, 53, 54, 55, 56, 57; 364/409

[56] References Cited

U.S. PATENT DOCUMENTS

| | | | |
|---|---|---|---|
| 3,790,072 | 2/1974 | Moldovan, Jr. | 235/54 R |
| 3,980,864 | 9/1976 | Smith, Jr. | 235/55 R |
| 4,046,992 | 9/1977 | Hohn et al. | 235/55 R |
| 4,236,066 | 11/1980 | Olmstead et al. | 235/50 R |
| 4,649,264 | 3/1987 | Carson | 235/54 R |
| 4,981,259 | 1/1991 | Ahmann | 235/56 |
| 5,218,528 | 6/1993 | Wise et al. | 235/56 X |

*Primary Examiner*—Donald T. Hajec
*Assistant Examiner*—Thien Minh Le
*Attorney, Agent, or Firm*—Robert M. Downey, P.A.

[57] ABSTRACT

A device and method for collecting voting data is disclosed, the device including a housing having a front face, back panel, opposite sides and a base, a visual character display, and a slot opening on the front face. A central processor within the housing stores data, including preprogrammed data and collected data in a primary memory, and controls operation of the components of the device, including a card reader. The card reader is structured to pull a ballot card through the slot opening for scanning data thereon, including votes cast by the voter, and transferring the scanned data to the central processor where the voting data is stored and tallied. The scanned ballot cards are deposited into a collection box within a locked interior of the housing. A bar code reader and/or a magnetic strip reader on the device reads encoded data on a voter's identification card, such as a voter registration number, so that the encoded data may also be transferred to the central processor for storage. A switch is responsive to removal of the ballot card collection box from within the housing to actuate a printer which prints a bar code on an adhesive-backed label, wherein the bar code contains the ballot card tallies stored in the central processor. The label is attached to the collection box containing all submitted ballot cards and can be scanned by a bar code scanner to read and transmit the tallied votes to a host computer or central facility.

12 Claims, 4 Drawing Sheets

DEVICE FOR COLLECTING VOTING DATA

BACKGROUND OF THE INVENTION

1. Field of the Invention

The present invention relates to data collection devices and, more specifically, to an electronic device for collecting polling data from a ballot card wherein the device reads the ballot card, tallies the ballot data, and stores the tallied data in a central processor for later retrieval and uploading to a host computer or central facility.

2. Description of the Related Art

The collection and tallying of votes during an election can be a monumental task. In particular, the election of government officials, whether municipal, state, or federal, requires collection and processing of votes from large sectors of the public, encompassing possibly millions of voters. Because of public pressure to receive the earliest possible outcome of an election, the collected votes must be tallied in a very short period of time. And, in many countries, the employed ballot collecting and vote tallying systems are vulnerable to fraud.

The related art includes devices for electronically counting and delivering the results of votes cast on ballot cards at polling places during an election. These devices collect the ballot cards in sealed ballot boxes, and then the sealed ballot boxes are transported to a central station where the votes are tallied either by hand counting or by electronic means. Other devices in the art provide for computer memory means to store the collected ballot data in memory, as well as on the submitted ballot cards which are deposited in a standard ballot box connected to the device. In this instance, the device and ballot box are transported to the central station for tallying the votes. An example of such a device is disclosed in the Webb U.S. Pat. No. 4,774,665. Because the ballot collection device is external of the device, the possibility of tampering with ballots still exists. For instance, ballot cards can be removed from the ballot collection box while in transit to the central station. Thereafter, if a recount of the votes is necessary and the data is lost or removed from the device's memory, the ballot cards in the collection box will need to be re-scanned. Due to the possibility of tampering, the recount may not provide the true and correct results of an election.

In spite of the various electronic ballot collecting devices known in the prior art, there still exists a need for a data collection device which is structured to receive, store and tally ballot data from all submitted ballot cards at a remote site and to store the submitted ballot cards within a collection box locked within the device so that the risk of fraud or tampering is substantially reduced.

SUMMARY OF THE INVENTION

The present invention is directed to a device for collecting polling data from a ballot card which is distributed to voters. The ballot card may be of the type which includes an array or preprinted enclosed areas (or bubbles) printed on the card in accordance with a predetermined arrangement. The bubbles are intended to be selectively darkened to cast a vote in response to questions or inquiries on the ballot, such as officials and issues being voted on. Alternatively, the ballot card may be a punch hole card wherein a voter utilizes a punch device to punch out select holes on the card to cast a vote.

The device of the present invention includes a housing having a front face, a back panel, a base, and a slot opening in the front face. A central processor unit within an interior of the housing includes a control circuit for controlling operation of the various components of the device as well as a memory means for storing both preprogrammed data and data read from submitted ballot cards. A visual display means on the housing provides instructional information relating to the use and operation of the device. An electronic reader device, such as an optical mark reader (OMR) or a punched hole reader (PHR), positioned and disposed in alignment with the slot opening within the housing interior, is structured to pull the submitted ballot card through the slot opening for scanning in order to read markings or holes on the card. The electronic reader device sends data corresponding with the readings of the darkened bubbles or punched holes to the central processor for storage in the central processor's memory.

After casting each vote, by darkening the appropriate bubbles with a pen or pencil, or by punching select holes, the ballot card is inserted into the slot for scanning by the OMR or PHR. The ballot card may include a lithocode or other identifying indicia along an edge of the card. The lithocode corresponds to the particulars of a ballot, such as the voting district which is stored in an "INI" (initialization) file, whether the ballot card is single or double-sided, and whether the language of the character display is to be in English, French, German, Spanish, Portuguese or another language. The INI file initiates various functions of the device including whether to prompt the voter to swipe his/her voter registration card prior to voting and determining whether a database containing all of the voter registration numbers for the particular machine has been uploaded into the central processor's memory so that the voters' ID numbers can be matched with the stored registration numbers. Accordingly, when a ballot card is inserted into the device, the OMR or PHR reads the lithocode thereon, enabling the central processor to match the ballot card with a particular INI file stored in the memory of the central processor.

A bar code and/or magnetic strip reader is attached to the top of the housing for reading data from a bar code or magnetic strip, such as may be provided on a voter registration card or on a small adhesive label which may be affixed to the ballot card at the time of voting. The voter registration card or label, having the bar code or magnetic strip thereon, is passed along the elongate slot of the reader, exposing the bar code or magnetic strip to the opposing elements of the reader. Identification data particular to that voter is read from the bar code or magnetic strip and thereafter transmitted and stored in the central processor.

The completed ballot cards are submitted by inserting them through the slot on the front of the device. After scanning by the OMR or PHR, the ballot cards are deposited within a specifically designed ballot card collection box maintained in captivated relation within the locked interior of the device. When the poll closes, and no more ballot cards are accepted, the device can be transported to a receiving station. At the receiving station, a door on the housing is unlocked and opened to retrieve the ballot card collection box containing all submitted ballot cards.

A switch within the housing interior is responsive to removal of the ballot card collection box. Upon removal of the collection box, the switch actuates transfer of the stored voting data from the central processor to a printer. The printer may be installed within the housing of the device or maintained as an external unit and interconnected via the central processor. The printer is adapted to print an adhesive-backed label having a bar code thereon which includes all ballot data collected, including the device's serial number, an identification of the polling station or precinct, and a tally of all votes on the ballot cards submitted in that device for that particular election. The printed label is affixed to the ballot card collection box and can be subsequently scanned by a bar code scanner device in order to read and upload the tallied votes to a host computer or central facility. The ballot card collection box containing all submitted ballot cards is thereafter sealed and stored at the receiving station or other facility in the event a subsequent verification or a recount of the voting results becomes necessary.

With the foregoing in mind, it is a primary object of the present invention to provide a polling data collection device adapted to read and collect polling data from a ballot card, store the data in a central processor's memory, and thereafter print the voting tallies on a label in bar code form.

It is a further object of the present invention to provide a device for collecting polling data as is required during an election, wherein the device is structured to contain a ballot card collection box within a locked housing for receiving and securely storing all submitted ballots.

It is still a further object of the present invention to provide a polling data collection device which is structured to print a bar code label, comprising a tally of votes for all submitted ballots, upon removal of a ballot card collection box from within the device, wherein the label is adapted to be affixed to the collection box, and further wherein the bar coded voting tallies can be scanned from the label by a bar code scanner and then transmitted to a host computer or central facility.

It is yet a further object of the present invention to provide a device for collecting polling data for an election, wherein the device includes a bar code reader and/or a magnetic strip reader for reading user specific data as may be encoded on a voter identification or registration card, or on a printed label affixed to each voter's ballot card.

These and other objects of the present invention will be more readily apparent in the description which follows.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
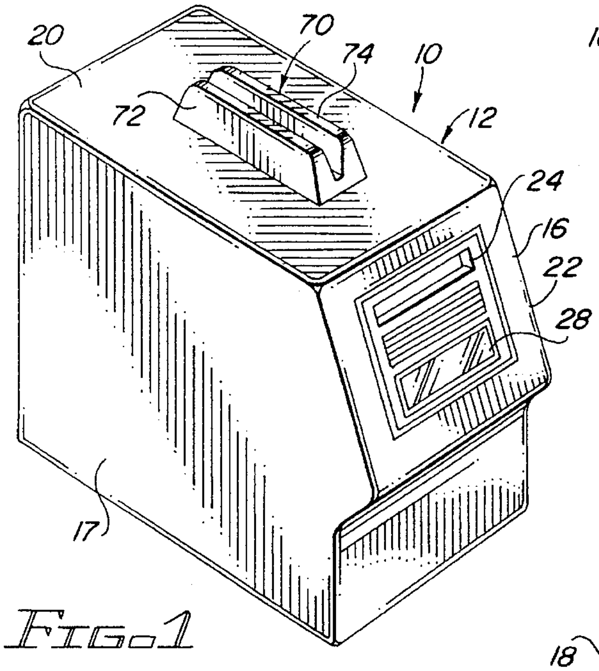
FIG. 1 is a front perspective view of the device of the present invention.
Figure 2:
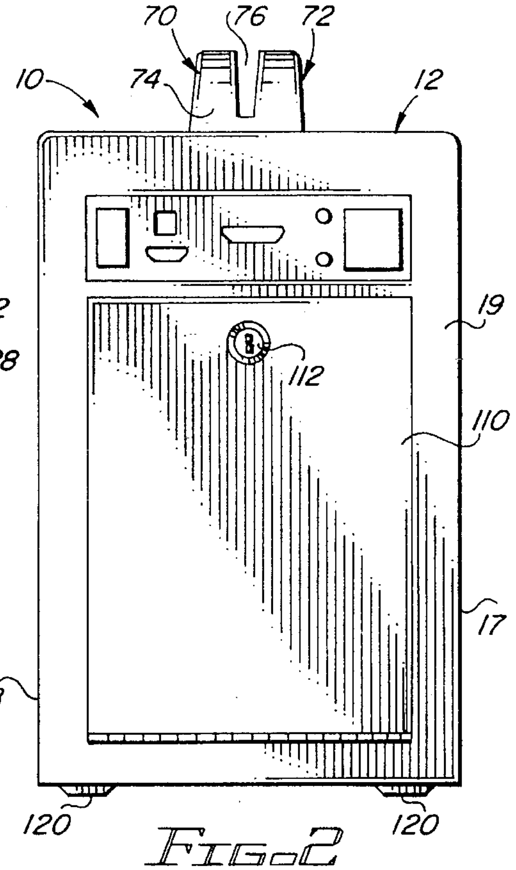
FIG. 2 is a rear elevational view of the device.

Referring to the several figures of the drawings, there is illustrated a polling data collection device of the present invention, referred to generally as 10. The device 10 includes a housing 12 having a base 14, a front panel 16, opposite sides 17, 18 and a back panel 19. Front panels 16 may be formed and configured as an integral piece to include a top side 20 and a front face 22. The front face includes a slot opening 24, and a character display 28. The character display 28 provides visual messages to the voter including instructional information relating to operation of the device.

Figure 3:
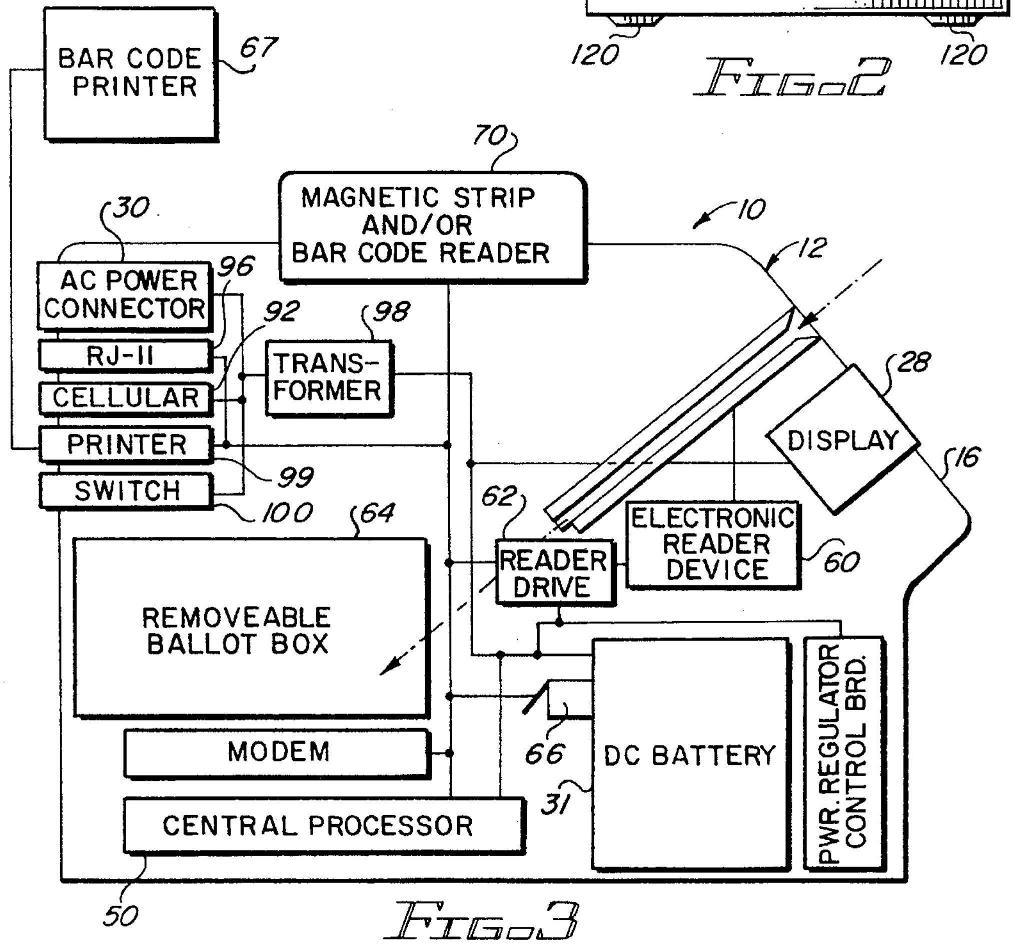
FIG. 3 is a schematic diagram illustrating the functional relationship of various components of the device.
Figure 4:
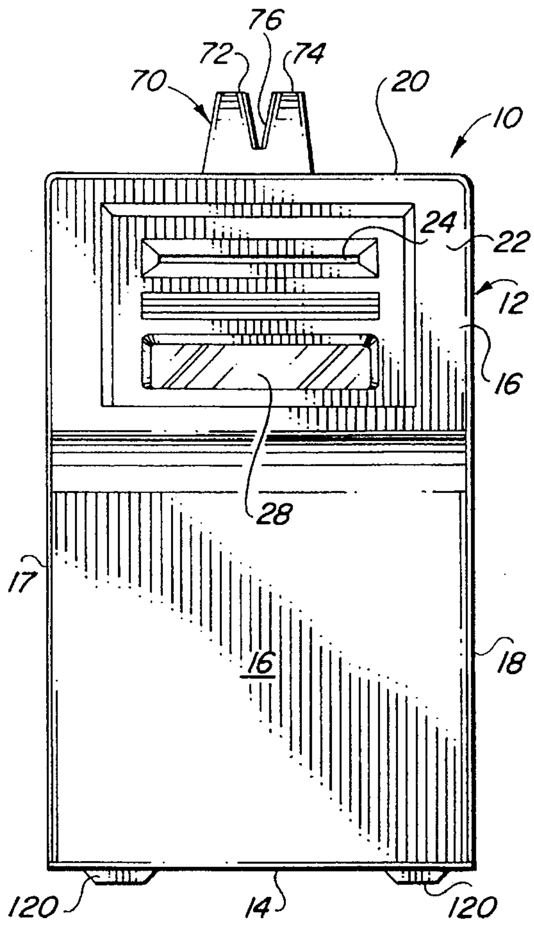
FIG. 4 is a front elevational view of the device.

Referring to FIG. 3, there is schematically illustrated the device 10 of the present invention, including the various component elements which are powered by an internal battery 31. A power cord connects to an AC power connector port 30 for recharging the internal battery 31. Specifically, the device 10 includes a central processor 50 including a control circuit for controlling operation of the various components of the device and a memory means for storing data therein. The memory means is preprogrammed with an INI (initialization) file and a database of all registered voters who are registered in the district or precinct where the device is to be situated during an election.

The visual character display interconnects with the central processor 50 and receives messages from the central processor's memory for display. The particular messages transmitted from the central processor 50 to the display 28 are prompted by various actions and operations of the various components during use.

An electronic reader device 60 supported within the housing 12 interior includes a reader drive 62 specifically structured to pull a ballot card through the slot opening 24 and past the reader device 60 for scanning thereof. The reader device 60 is structured to scan and read the ballot card once pulled therethrough in order to detect and locate electronically readable indicators on the ballot card.

Figure 7:
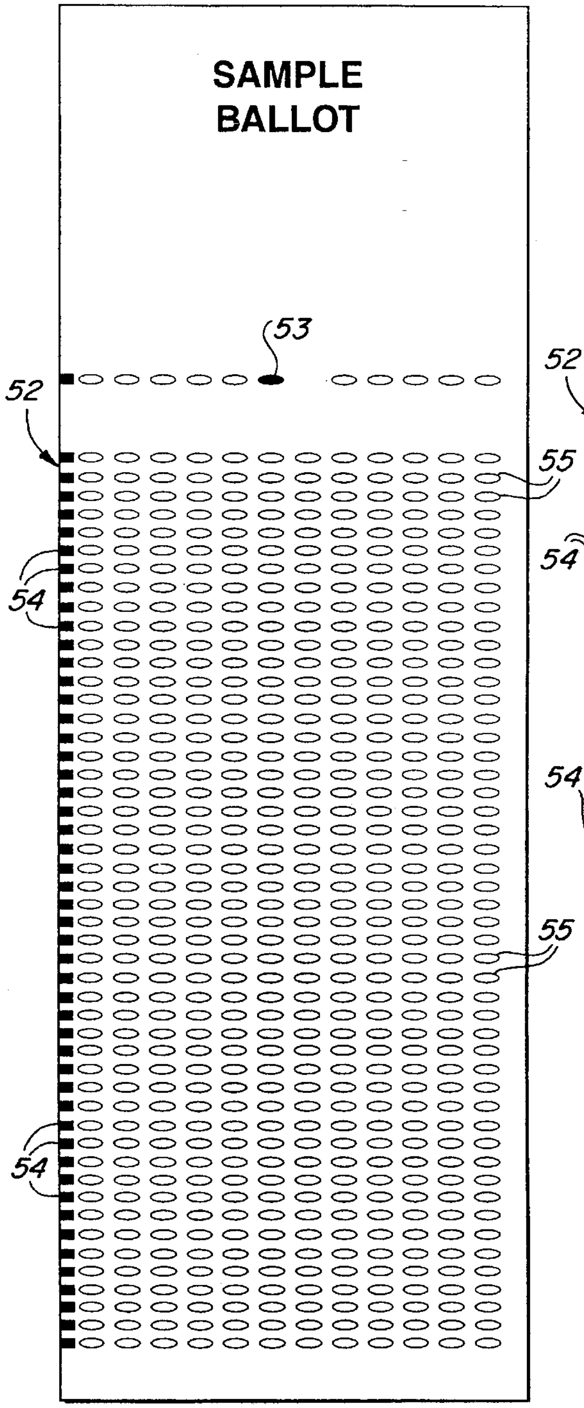
FIG. 7 is a plan view illustrating an optical mark type ballot card for use with the device, wherein the device includes an optical mark reader.
Figure 8:
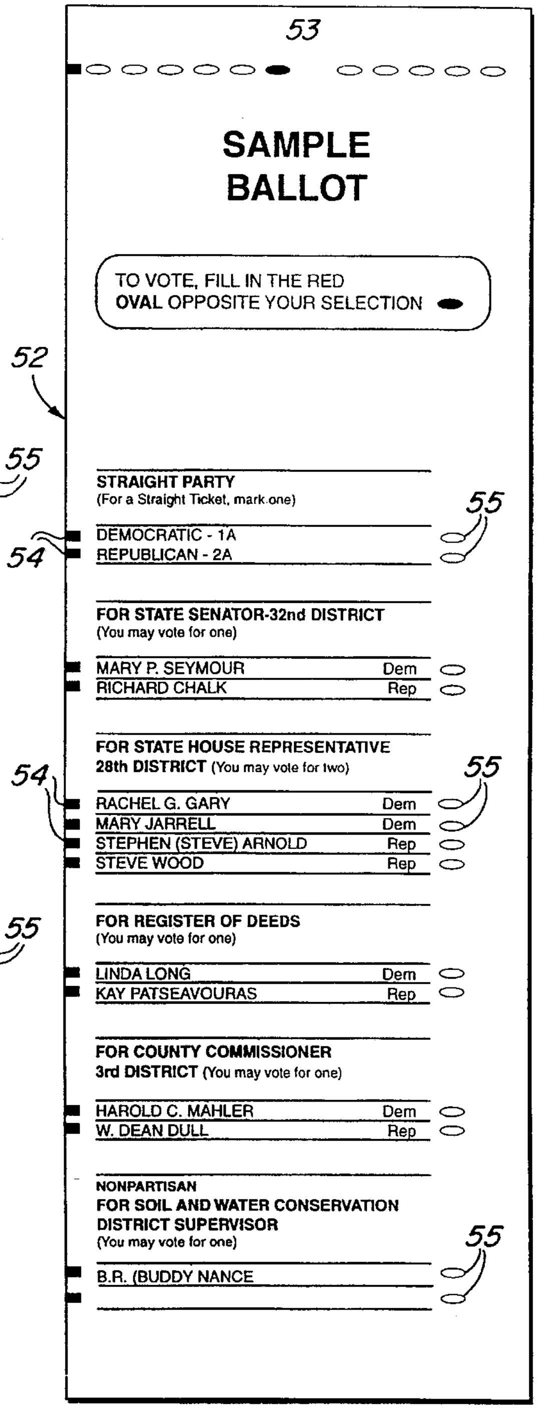
FIG. 8 is a plan view illustrating an alternative optical mark type ballot card for use with the device.

The electronic reader device 60 can be an optical mark reader (OMR) which is structured to read a ballot card 52 of the type generally shown in FIGS. 7 and 8. This ballot card 52 includes darkened areas on the card, including a lithocode 53 or identifying indicia, timing marks 54, and bubbles 55, some of which are darkened (filled-in) by the voter to cast a vote. The OMR scans the ballot card 52 and reads the darkened areas, which represent the voting data, and thereafter sends the voting data to the central processor for storage in the central processor's memory. This voting data is thereafter consolidated in the central processor's memory in accordance with the particular lithocode identified in the INI (initialization) file, the precinct number (or location of the device), as well as other information which may be needed to conduct an election. Thus, all response data from the scanned ballot cards is grouped, consolidated and stored in the central processor's memory. The central processor then tallies all votes submitted on the received ballot cards.

Figure 9:
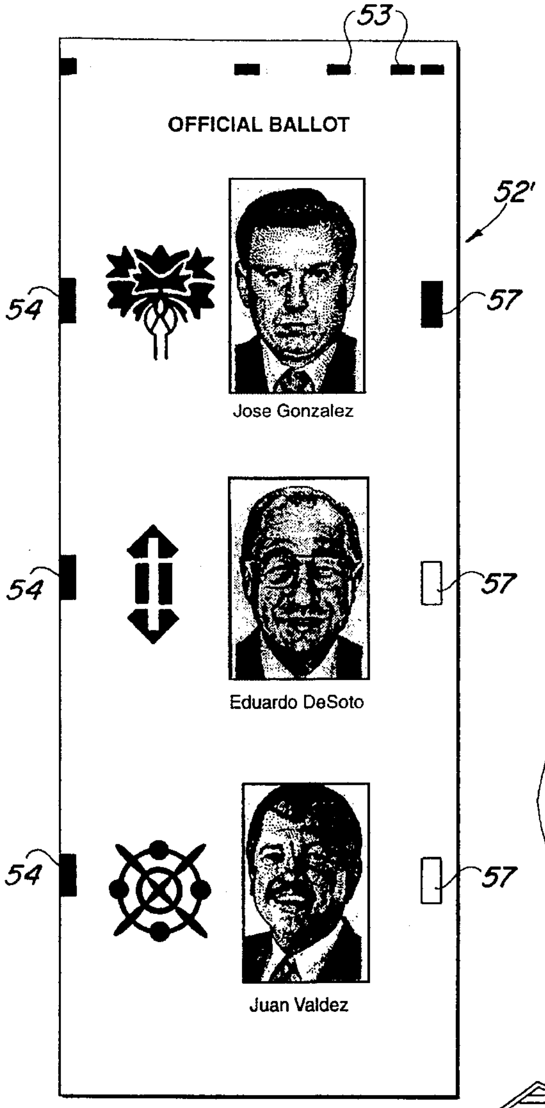
FIG. 9 is a plan view illustrating a punched hole type ballot card for use with the device, wherein the device includes a punched hole reader.

Alternatively, the electronic reader device 60 can be a punched hole reader (PHR) which is structured to read a ballot card 52' of the type generally illustrated in FIG. 9. This ballot card 52' includes an array of perforated circles, rectangles, squares or other shapes, indicated as 57 and arranged in columns and rows. The perforated shapes 57 are adapted to be selectively punched out by the voter with a punching instrument in order to cast a vote. The PHR scans the ballot card 52' and identifies the punched-out shapes, representing the voting data. The voting data is thereafter sent to the central processor for storage and tallying in the manner described above.

Figure 11:
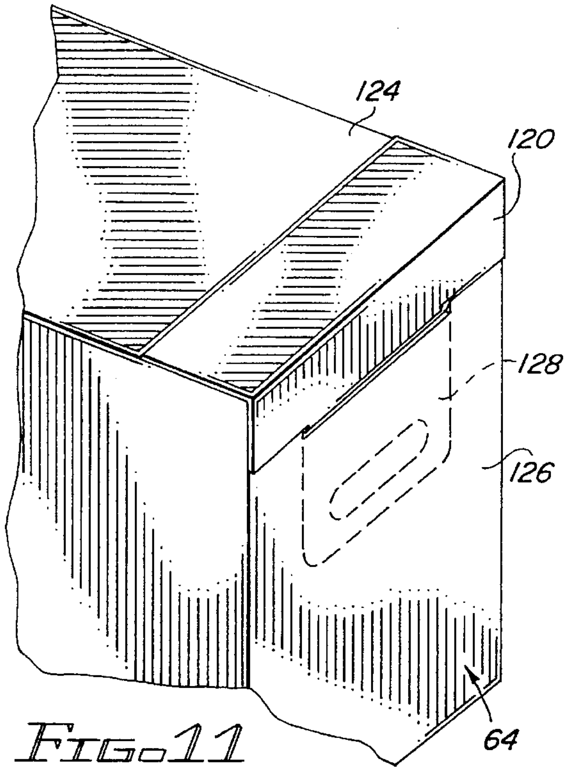
FIG. 11 is a perspective view of the ballot card collection box shown closed and sealed for storage.
Figure 10:
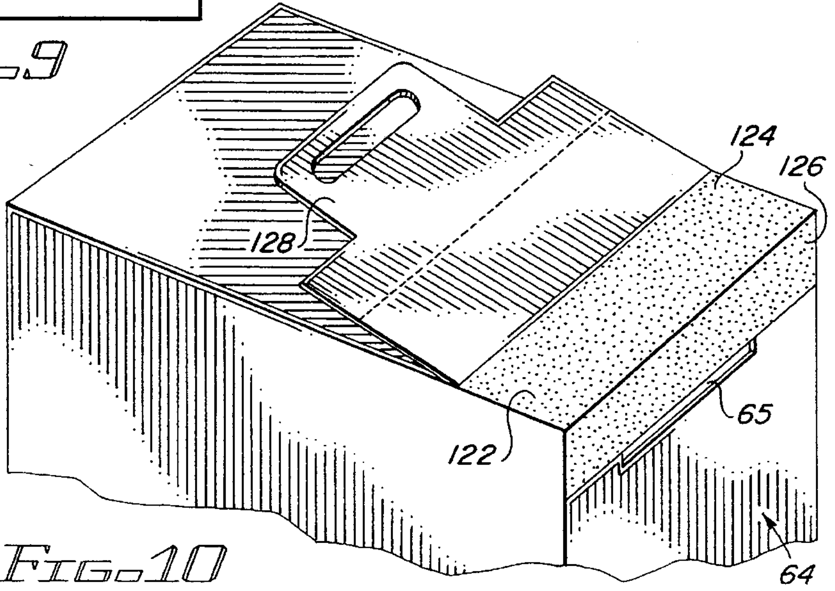
FIG. 10 is a perspective view of a ballot card collection box, shown open, which is designed for receipt within an interior of the device to receive and store submitted ballot cards therein.

After scanning by the reader device 60, the reader drive 62 directs the scanned ballot card into a ballot card collection box 64 removably contained within the locked interior of the housing 12. The ballot card collection box 64 (shown in FIGS. 10 and 11) is structured to receive the scanned ballot cards and includes a slot opening 65 sized, configured and disposed for alignment with the reader drive 62. To seal the box closed, a cover flap 120 on the collection box 64 folds over for mating attachment with an adhesive 122 on the top 124 and side panel 126. A flap extension 128 on the cover flap 120 fits through the slot opening 65 of the collection box 64 to close off the opening 65.

When the election has ended, the device 10 may be transported to a receiving station. An authorized person having a key to the device opens the access door of the housing 12 and removes the ballot card collection box 64.

Figure 6:
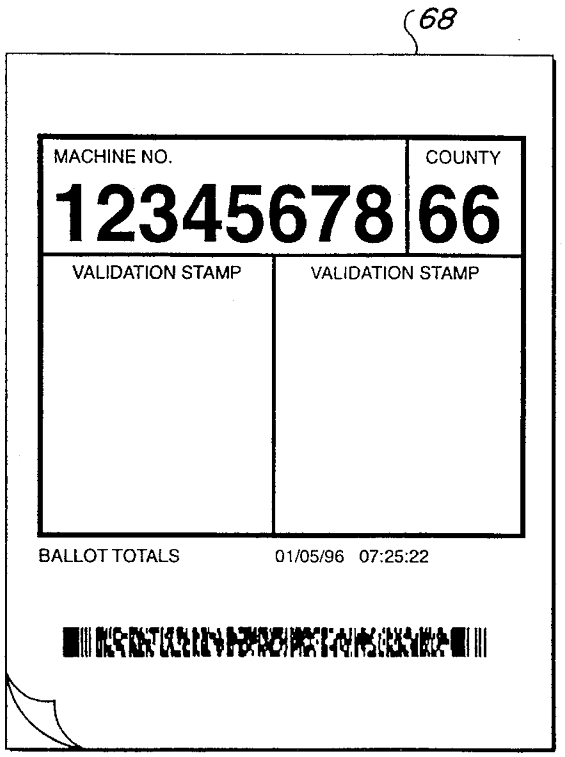
FIG. 6 is a plan view of the label printed by the device for attachment to a ballot card collection box.
Figure 5:
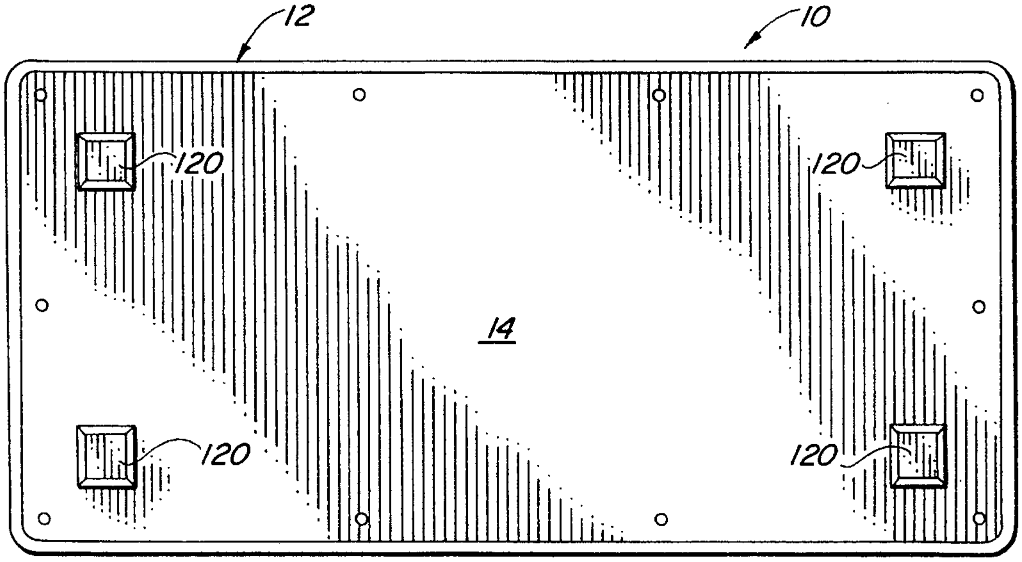
FIG. 5 is a bottom plan view of the device.

A switch 66 within the housing interior is responsive to removal of the ballot card collection box 64. When the collection box 64 is positioned within the housing 12 in proper orientation to receive the ballot card from the reader drive 62, the switch 66 is maintained in a closed position. Upon removal of the collection box 64, the switch is opened to actuate transfer of the tallied voting data to a bar code printer 67. The printer, being actuated, prints a bar code on an adhesive-backed label 68, as seen in FIG. 6. The printed bar code includes identifying indicia thereon. Specifically, the printed bar code on label 68 includes the machine serial number to identify the particular device, the county or precinct number, an area to apply a validation stamp, and ballot totals (or a tally) indicated in bar code form. The date and time of printing of the label 68 is further indicated on the label. Once the ballot card collection box 64 has been removed from the housing interior, the label 68 is affixed to the box 64. The bar code, containing the tallied results, can be subsequently scanned by a bar code scanner and transmitted to a host computer or central facility for recording and reporting of the election results. The printer 67 is also adapted to print labels having bar code indicia thereon relating to specific voter registration data. In this instance, the bar code printer prints a list of voter registration numbers representing each registered voter. Each registered voter's bar code indicia is peeled off of the list and placed on the voter's ballot card prior to the voter inserting the ballot card into the slot 24.

A bar code and/or magnetic strip reader 70 is provided on the top side 20 of the housing 12 and includes two parallel, elongate blocks 72, 74 disposed in spaced, parallel relation to define an elongate slot 76 therebetween. Either or both of the blocks 72, 74 may be provided with a magnetic strip reader and/or bar code scanner element facing inwardly toward the elongate slot 76 so that a magnetic strip or bar code on the voter's ballot card, voter registration card, or other identifying indicia can be read upon passing the bar code or magnetic strip along the slot 76. By identifying the particular bar code indicia of a specific voter, the voter can be electronically crossed off the list, thereby preventing the same voter from submitting more than one ballot card. Further, by identifying the registered voter, non-registered voters will be prevented from submitting ballot cards. If a ballot card belonging to a non-registered voter is submitted, the central processor, identifying the ballot card as belonging to a non-registered voter, will reject the ballot card.

The back panel 19 is provided with several ports and/or jacks to facilitate interconnection of the device with various external components such as a computer, an external printer, and a cellular transceiver. In particular, the back panel is provided with a connector 92 to power a cellular transceiver. In order to facilitate interconnection with the cellular transceiver, an RJ-11 port 96 enables transfer of data via a wireless transmission media. An AC power connection 30 is provided for connecting the device to an AC power source to recharge the internal battery 31. A transformer 98 is provided to step down voltage from the incoming AC power so as to properly charge the internal battery 31.

As mentioned earlier, the device 10 can be interconnected with an external bar code printer 67 via a printer port 99. Alternatively, an internal bar code printer may be provided within the device and interconnected with the central processor. In either case, on site printing of labels containing encoded data and other indicia thereon are provided, as described above. The device is energized by actuating a switch 100 on the rear panel to deliver power to the various components.

A hinged door 110 on the rear panel includes a lock 112 to secure the housing interior. After the closing of the poll, the door is unlocked and opened to remove the ballot card collection box.

The base 14 of the housing 12 includes rubber feet 120 so that the device 10 can be supported on a table or other convenient surface.

While the instant invention has been shown and described in what is considered to be preferred and practical embodiments thereof, it is recognized that the invention is not to be limited in scope except as set forth in the following claims and within the doctrine of equivalents.

Now that the invention has been described,

What is claimed is:

1. A method of collecting voting data from voters comprising the steps of:

distributing at least one ballot card to each of the voters, the ballot card being of the type adapted to be read by an electronic reader device, wherein the voter completes the ballot card by marking predetermined areas on the card or by punching holes through the ballot card at predetermined locations on the ballot card to cast one or more votes;

accepting completed ones of said ballot cards from the voters;

scanning said ballot cards with an electronic reader device to read voting data therefrom by identifying the location of marks or holes made by the voter and other marks or holes in said ballot cards;

depositing said scanned ballot cards into a ballot card collection box contained within a locked housing;

transmitting said voting data read from each of the ballot cards to a memory means for storage therein;

tallying said voting data;

removing the ballot card collection box from within said housing;

sensing removal of the ballot card collection box from within the housing and simultaneously actuating a bar code printer device;

printing a bar code on an adhesive-backed label, wherein the printed bar code contains a tally of said voting data and which bar code is only readable using a specific decoding program;

affixing said label to said collection box containing said scanned ballot cards;

sealing the collection box closed;

scanning the printed bar code on said label with a bar code scanner device to read said tallied voting data; and uploading said tallied voting data to a host computer or central station for aggregating and reporting the election results.

2. A method as recited in claim 1 further including the steps of:

reading identification data specific to a particular voter from a bar code, and transmitting said identification data to said memory means.

3. A method as recited in claim 1 further including the steps of:

reading identification data specific to a particular voter from a magnetic strip, and transmitting said identification data to said memory means.

4. A method as recited in claim 2 further including the steps of:

printing said bar code containing said identification data specific to a particular voter on a label, affixing said label to said ballot card, reading said bar code to obtain said identification data prior to said step of scanning said ballot cards, transmitting said identification data to said memory means, and matching said transmitted identification data with pre-stored data in said memory means to determine if the voter is registered and authorized to submit said ballot card.

5. A method as recited in claim 1 wherein said collection box is contained within a secured housing in position to receive said ballot cards after scanning thereof.

6. A method as recited in claim 5 further comprising the steps of:

removing said collection box from said housing after completing collection of said voting data, sensing removal of said collection box, and actuating a printer to print the bar code containing the tallied polling data on said adhesive-backed label.

7. A device for collecting voting data from a ballot card of the type adapted to receive electronically readable indicators thereon, wherein the electronically readable indicators include votes cast by a voter, said device comprising:

a housing including a front face, a back panel, a base, and a slot opening in said front face sized and configured for receipt of the ballot card therethrough, a central processor unit within an interior of said housing and including control circuit means for controlling operation of said device, and primary memory means for storing data therein, including the collected voting data, and for tallying the collected voting data, visual display means on said housing for displaying information including instructional information relating to use and operation of said device, an electronic reader positioned and disposed within said interior of said housing in communication with said slot opening and structured to scan and read said ballot card to identify the electronically readable indicators thereon, including the voting data, and being further structured to transmit the voting data to said central processor unit for storage in said primary memory means, a ballot card collection box having an opening therein, said collection box being sized and configured for receipt within said interior of said housing to receive said ballot cards through said opening therein after scanning by said electronic reader, printer means for printing a bar code on an adhesive-backed label, wherein the bar code contains identification data and a tally of the collected voting data, said label being adapted to be affixed to said collection box for subsequent scanning by a bar code scanner device to read the tallied voting data and upload the tallied voting data to a host computer or central station, and switch means responsive to removal of said collection box from said housing interior for actuating said printer means to print said bar code on said label.

8. A device as recited in claim 7 further including a magnetic strip reader interconnected to said central processor unit and structured and disposed to read data encoded on a magnetic strip.

9. A device as recited in claim 8 wherein said magnetic strip reader is structured and disposed to facilitate passage of a substrate through a slot thereof, wherein the substrate includes a magnetic strip thereon.

10. A device as recited in claim 7 further including a bar code reader interconnected to said central processor unit and structured and disposed to scan a bar code and transmit scanned data obtained from said bar code for storage in said central processor unit.

11. A device as recited in claim 7 wherein said electronic reader is an optical mark reader.

12. A device as recited in claim 7 wherein said electronic reader is a punched hole reader.

* * * * *